(12) United States Patent
Kemmer

(10) Patent No.: US 12,158,240 B2
(45) Date of Patent: Dec. 3, 2024

(54) METHOD FOR OPENING A VALVE ASSEMBLY FOR A FUEL TANK

(71) Applicant: Robert Bosch GmbH, Stuttgart (DE)

(72) Inventor: Helerson Kemmer, Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 214 days.

(21) Appl. No.: 17/794,669

(22) PCT Filed: Dec. 23, 2020

(86) PCT No.: PCT/EP2020/087749
§ 371 (c)(1),
(2) Date: Jul. 22, 2022

(87) PCT Pub. No.: WO2021/148220
PCT Pub. Date: Jul. 29, 2021

(65) Prior Publication Data
US 2023/0056873 A1    Feb. 23, 2023

(30) Foreign Application Priority Data

Jan. 22, 2020   (DE) .................... 10 2020 200 679.2

(51) Int. Cl.
*F17C 13/04*    (2006.01)
*F16K 31/06*    (2006.01)
*F17C 13/12*    (2006.01)

(52) U.S. Cl.
CPC .......... *F17C 13/04* (2013.01); *F16K 31/0675* (2013.01); *F17C 13/123* (2013.01);
(Continued)

(58) Field of Classification Search
CPC ......... F17C 13/04; F17C 13/123; F17C 2205/0326; F17C 2205/0332;
(Continued)

(56) References Cited

U.S. PATENT DOCUMENTS

2003/0010325 A1   1/2003   Reischl et al.
2013/0277587 A1*  10/2013  Zieger .................. F16K 27/029
                                                         251/129.15
(Continued)

FOREIGN PATENT DOCUMENTS

DE   112007000513 T5   6/2009
DE   102009060028 A1   6/2011
(Continued)

OTHER PUBLICATIONS

Translation of International Search Report for Application No. PCT/EP2020/087749 dated Apr. 19, 2021 (4 pages).

*Primary Examiner* — Donnell A Long
(74) *Attorney, Agent, or Firm* — Michael Best & Friedrich LLP

(57) ABSTRACT

The invention relates to a method for opening a valve assembly for a fuel tank, comprising a pilot valve ($V_1$) and at least one additional valve ($V_2$), in particular for use in a fuel cell-operated vehicle, having the steps of applying (30) an amplification voltage ($S_1$) in order to open the pilot valve ($V_1$) in an opening phase ($P_1$) of the pilot valve ($V_1$), deactivating (32) the amplification voltage (S1) in order to terminate the opening phase ($P_1$) of the pilot valve ($V_1$), applying (34) a pull-in voltage ($S_2$) in a pull-in phase ($P_2$) of the pilot valve ($V_1$) in order to hold the pilot valve ($V_1$) open, and activating and deactivating (36) the pull-in voltage ($S_2$) in an alternating manner in order to hold the pilot valve ($V_1$) open and in order to open the at least one other valve ($V_2$) and hold same open in a readjustment phase ($P_3$) such that the hold-open energy required on average for holding the pilot valve ($V_1$) open and the opening energy and/or hold-open energy required on average for the at least one other valve ($V_2$) is provided.

14 Claims, 3 Drawing Sheets

(52) U.S. Cl.
CPC ............... *F17C 2205/0326* (2013.01); *F17C 2205/0332* (2013.01); *F17C 2221/012* (2013.01); *F17C 2223/036* (2013.01); *F17C 2250/032* (2013.01); *F17C 2260/042* (2013.01); *F17C 2260/046* (2013.01); *F17C 2270/0178* (2013.01); *F17C 2270/0184* (2013.01)

(58) Field of Classification Search
CPC .......... F17C 2221/012; F17C 2223/036; F17C 2250/032; F17C 2260/042; F17C 2260/046; F17C 2270/0178; F17C 2270/0184; F17C 13/12; F17C 2205/0323; F16K 31/0675; Y02E 60/32; Y02E 60/50

See application file for complete search history.

(56) References Cited

U.S. PATENT DOCUMENTS

| | | |
|---|---|---|
| 2016/0208724 A1 | 7/2016 | Melis et al. |
| 2018/0209588 A1 | 7/2018 | Hanada et al. |
| 2019/0040972 A1* | 2/2019 | Schrader .................. H01F 7/18 |
| 2019/0170260 A1 | 6/2019 | Hausmann |
| 2019/0249779 A1 | 8/2019 | Albert et al. |
| 2019/0323447 A1* | 10/2019 | Inaba ...................... F02D 41/20 |

FOREIGN PATENT DOCUMENTS

| | | |
|---|---|---|
| DE | 102014014526 A1 | 3/2016 |
| DE | 102015212739 A1 | 1/2017 |
| DE | 102016202185 A1 | 8/2017 |
| DE | 102016219890 B3 | 8/2017 |
| DE | 102016008035 A1 | 1/2018 |
| EP | 2484885 A1 | 8/2012 |
| EP | 2653763 A2 | 10/2013 |
| GB | 2574229 A | 12/2019 |
| JP | 2015069910 A | 4/2015 |
| JP | 5952150 B2 | 7/2016 |

* cited by examiner

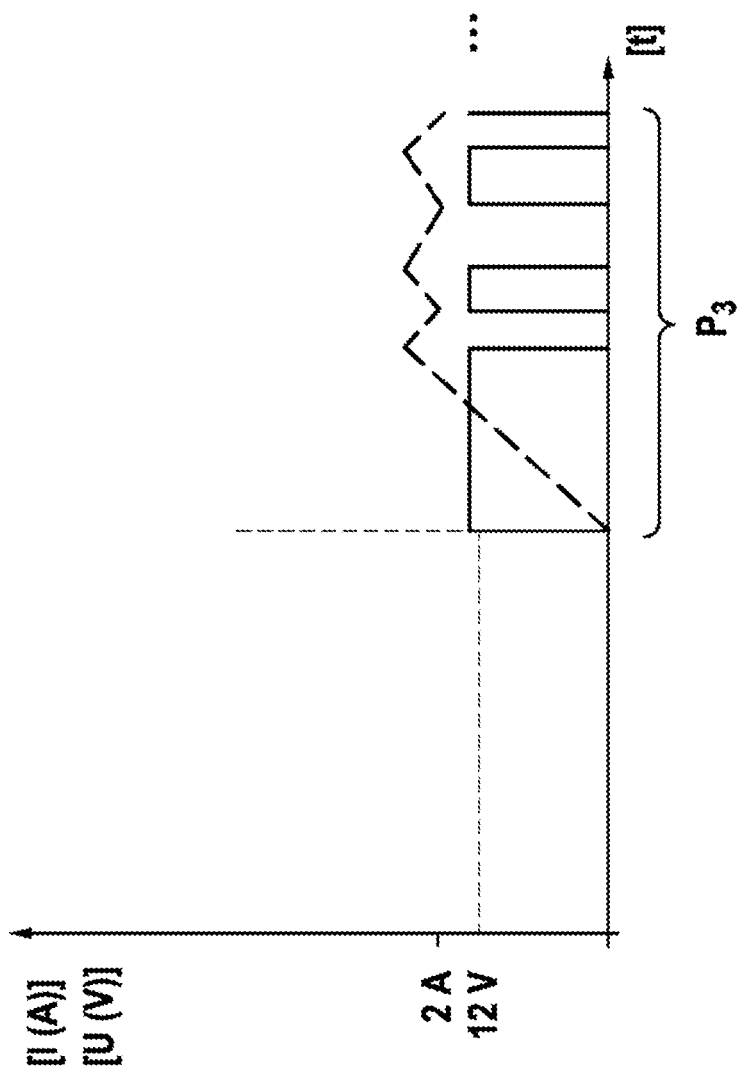

METHOD FOR OPENING A VALVE ASSEMBLY FOR A FUEL TANK

BACKGROUND OF THE INVENTION

The present invention takes as its starting-point a method according to the type specified in the independent method claim, and also a system according to the type specified in the independent system claim.

Hydrogen-based fuel cells are considered to be the mobility concept of the future, since they emit only water as exhaust gas and they make fast refueling-times possible. Fuel-cell systems need air and hydrogen for the chemical reaction. The hydrogen is stored in gaseous form under pressure in one or more tanks. The pressure vessels known today from the prior art frequently exhibit a plurality of tank valves for closing and opening the pressure vessels, which, as a rule, take the form of solenoid valves and can be opened by applying an opening voltage of 12 V, for instance. When opening during operation, the valves firstly have to open contrary to a large pressure differential, requiring a lot of energy for a short time. Although this high opening energy has to be available in the opening phase only for a period of less than 1 second, and for the rest of the time merely the distinctly lower keep-open energy has to be applied for keeping the tank valves open, the magnetic circuit of the solenoid valves must necessarily also have been designed for the conditions in the opening phase. Such an overdimensioning of the magnetic circuit of solenoid valves is disadvantageous, in particular for reasons of cost and from the standpoint of energy. An appropriate design of the magnetic circuits for overcoming large pressure differentials is also required for reasons relevant to safety for the case of the outbreak of fire in the event of accidents. Although most pressure vessels are equipped with temperature-controlled safety relief valves (so-called TPRDs-thermal pressure-relief devices), these may open late or not at all in the case of fires located remotely, so it is necessary to discharge the pressure within the pressure vessel, which rises as a result of the increase in temperature, via the tank valves. However, in the case of an insufficiently dimensioned magnetic circuit the increase in pressure within the tank may have the result that the tank valves can no longer open at all, since the energy required for overcoming the pressure differentials cannot be applied.

SUMMARY OF THE INVENTION

Features and details that have been described in connection with the method according to the invention also hold, as a matter of course, in connection with the system according to the invention, and conversely in each instance, so reference is made, or can be made, at all times reciprocally with respect to the disclosure relating to the respectively individual aspects of the invention.

The advantage of the method according to the invention for opening a valve assembly for a fuel tank can be seen, in particular, in the fact that a particularly energy-efficient opening of a plurality of valves is made possible by means of the activation, according to the invention, of a valve assembly for a fuel tank. In addition, the application of the method according to the invention does not require any special manufacture of certain valves, and consequently achieves a cost-reduction by virtue of the standardizable production. Moreover, the application of the method according to the invention permits an enhancement of safety, inasmuch as a reliable opening of the tank valves is practicable even in the case of large pressure differentials between the inside and the outside of a pressure vessel, for instance by reason of an outbreak of fire.

The method according to the invention for opening a valve assembly for a fuel tank may come into operation, in particular, in motor vehicles such as passenger cars or trucks. Likewise conceivable, in addition, is use in other vehicles or means of locomotion, such as forklifts, cranes, ships or flying objects. Use in stationary systems is equally conceivable. The method according to the invention for opening a valve assembly for a fuel tank, said valve assembly comprising a pilot valve and at least one further valve, in particular for application in a fuel-cell-powered vehicle, comprises the steps of applying a booster voltage for opening the pilot valve in an opening phase of the pilot valve, switching off the booster voltage for concluding the opening phase of the pilot valve, applying an energizing voltage for keeping the pilot valve open in an energizing phase of the pilot valve, and also switching the energizing voltage alternately off and on for keeping the pilot valve open and for opening and keeping open the at least one further valve in a post-control phase, so that the mean requisite keep-open energy for keeping the pilot valve open and also the mean requisite opening energy and/or keep-open energy of the at least one further valve is made available.

Within the scope of the invention, a "valve assembly" may be understood to mean, in particular, an interconnected system consisting of a plurality of valves. Furthermore, a "pilot valve" may preferentially be understood to mean a valve, for closing a pressure vessel, to be activated first before all further valves, which can advantageously be directly connected to the pressure vessel. A "further valve" may correspondingly be understood to mean a valve, for closing a pressure vessel, to be actuated after the pilot valve. In this connection, the pilot valve may have been dimensioned to be similar to the further valve or valves, preferentially dimensioned and/or configured to be completely identical. Furthermore, within the scope of the invention the "mean requisite keep-open energy" may be understood to mean, in particular, the energy that has to be applied on average over a certain period of time so that a pilot valve and/or the at least one further valve can still remain in the open state after opening. With regard to the transition from the energizing phase to the post-control phase, it will be understood that the energizing voltage can be switched off only prior to a conclusion of the energizing phase of the pilot valve, just like the booster voltage can be switched off only prior to the conclusion of the opening phase of the further valve, before the post-control phase is initiated and the energizing voltage can be alternately switched off and on. Though it is equally conceivable to initiate the post-control phase directly, since the energizing voltage is switched off and on in the post-control phase anyway. In an optional final method step, in concrete terms a switching of the energizing voltage off for concluding the post-control phase may, for instance, also be provided, which can preferentially be undertaken by simultaneously closing the pilot valve and the at least one further valve. It will be understood, furthermore, that, besides at least one further valve, a plurality of further valves may also be provided, which in a post-control phase can be opened or kept open, at least partially, in succession or simultaneously.

With regard to a quick and effective opening of a pilot valve and a simultaneously energy-efficient opening of a further valve or of a plurality of further valves, in accordance with the invention there may advantageously be provision that the booster voltage is numerically greater than the energizing voltage, the booster voltage preferentially having an absolute value of more than 12 V, particularly preferably an absolute value of more than 65 V, in particular an absolute value of at least 400 V. The booster voltage may be applied to a solenoid valve, for instance, advantageously in such a manner that an opening current of more than 5 A, preferentially of more than 7 A, in particular of at least 10 A, flows at least temporarily in the coil of the solenoid valve, so that a swift equalization of pressure is guaranteed.

Similarly, with regard to a quick and effective opening of a pilot valve and a subsequent energy-efficient opening of a further valve or of a plurality of further valves, there may advantageously be provision that the opening phase lasts for more than 2 ms, preferentially more than 5 ms, in particular more than 10 ms.

Within the scope of particularly energy-efficient operation for opening a tank valve, it is furthermore conceivable that the energizing voltage is lower than the booster voltage, the energizing voltage preferentially having a value of 12 V or less.

Similarly, with regard to particularly energy-efficient operation for opening a tank valve, there may be provision that the alternating switching of the energizing voltage off and on in a post-control phase is undertaken in such a manner that an opening current and/or keep-open current of at least 2 A on average is set.

Within the scope of a method that is capable of being adapted particularly easily and flexibly for opening a valve assembly for a fuel tank, it is furthermore conceivable that the frequency and/or the amplitude of the alternating switching of the energizing voltage off and on in the keep-open phase is varied as a function of the operating conditions, in particular as a function of the counterpressure and/or of the temperature. Such a variation of the energizing voltage is particularly advantageous in a design with a plurality of further valves.

Also a subject of the invention is, furthermore, a system for opening a valve assembly for a fuel tank for use in a fuel-cell-powered vehicle. The system according to the invention comprises a pilot valve, at least one further valve, and a control unit for applying a booster voltage for opening the pilot valve and also for applying an energizing voltage for keeping the pilot valve open and for opening and keeping open the at least one further valve, the control unit having been designed and arranged within the system in such a manner that the mean requisite keep-open energy for keeping the pilot valve open and for opening and keeping open the at least one further valve is capable of being made available by an alternating switching of the energizing voltage off and on. Therefore the system according to the invention exhibits the same advantages as have already been described in detail with respect to the method according to the invention. Within the scope of a particularly compact and comprehensive design, the system may furthermore exhibit at least one fuel tank. The fuel tank may take the form, in particular, of a hydrogen tank or natural-gas tank.

In order to be able to guarantee sufficient safety even in the event of accidents or total discharges or such like, in accordance with the invention there may advantageously be provision, furthermore, that the pilot valve and/or the at least one further valve take the form of self-closing valves, preferentially solenoid valves.

In order to identify an advantageous point in time for the initiation of an opening process of a pilot valve and/or further valve, in concrete terms there may furthermore be provision that a detection unit is provided for detecting measured values for determining a suitable point in time for applying a variable voltage. A possible measured value in this connection may be, in particular, the actual counterpressure or the pressure differential and/or the actual internal temperature and/or external temperature.

With regard to a reliable determination of an advantageous point in time for the initiation of an opening process of a pilot valve and/or of a further valve, in concrete terms there may furthermore be provision that a processing unit is provided for determining a suitable point in time for applying a variable voltage on the basis of measured values detected by means of the detection unit. In this connection, a processing unit can, in particular, perform a subsequent processing of the measured values recorded by the detection unit—for instance, an averaging and/or weighting or another type of evaluation-in order to guarantee a reliable determination of an advantageous point in time for the initiation of an opening process. With regard to a simple and rapid communication of data, the control unit, the processing unit and the detection unit may furthermore have been connected to one another, preferentially via a control line. Within the scope of an assembly that is capable of being easily integrated and flexibly arranged, the control unit, the processing unit and the detection unit may also have been connected to one another in wireless manner via WLAN, Bluetooth or NFC or such like.

Likewise a subject of the invention is, furthermore, a motor vehicle including a system described above, in particular a fuel-cell-powered motor vehicle including a system described above.

BRIEF DESCRIPTION OF THE DRAWINGS

Further advantages, features and particulars of the invention arise out of the following description, in which embodiments of the invention are described in detail with reference to the drawings. In this connection, the features mentioned in the claims and in the description may be essential for the invention, individually in each instance or in any combination.

Shown are.

DETAILED DESCRIPTION

Figure 1:
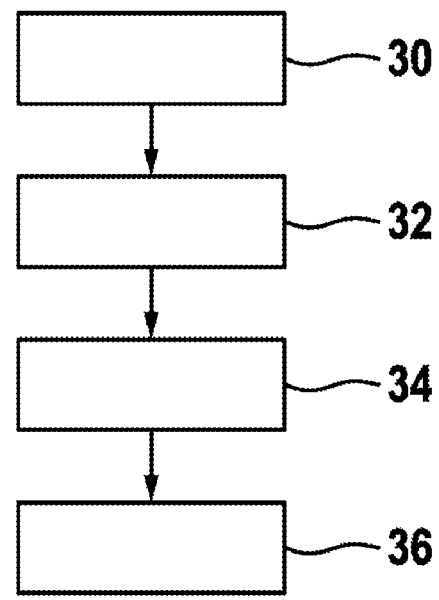
FIG. 1 a schematic representation of the individual steps of a method according to the invention for opening a valve assembly for a fuel tank, FIG. 2 a schematic representation of the activation profile for the pilot valve, FIG. 3 a schematic representation of the activation profile for further tank valves.

FIG. 1 shows a schematic representation of the individual steps of a method according to the invention for opening a valve assembly for a fuel tank, said valve assembly comprising a pilot valve $V_1$ and at least one further valve $V_2$, in particular for use in a fuel-cell-powered vehicle.

The method includes the step of applying 30 a booster voltage $S_1$ for opening the pilot valve $V_1$ in an opening phase $P_1$ of the pilot valve $V_1$. The booster voltage $S_1$ is advantageously numerically greater than an energizing voltage $S_2$ to be applied subsequently, the booster voltage $S_1$ preferentially having an absolute value of more than 12 V, particularly preferably an absolute value of more than 65 V, in particular an absolute value of at least 400 V.

In a subsequent second step of the method according to the invention, a switching off 32 of the booster voltage $S_1$ is undertaken for concluding the opening phase $P_1$ of the pilot valve $V_1$. The opening phase $P_1$ may last, for instance, for more than 2 ms, preferentially more than 5 ms, in particular more than 10 ms.

According to a subsequent third step of the method according to the invention, an application 34 of an energizing voltage $S_2$ is undertaken for keeping the pilot valve $V_1$ open in an energizing phase $P_2$ of the pilot valve $V_1$. The energizing voltage $S_2$ is advantageously lower than the booster voltage $S_1$, the energizing voltage $S_2$ preferentially having a value of 12 V or less.

According to the fourth step of the method according to the invention, an alternating switching off and on 36 of the energizing voltage $S_2$ is undertaken for keeping the pilot valve $V_1$ open and for opening and keeping open the at least one further valve $V_2$ in a post-control phase $P_3$, so that the mean requisite keep-open energy for keeping the pilot valve $V_1$ open and also the mean requisite opening energy and/or keep-open energy of the at least one further valve $V_2$ is made available. The alternating switching of the energizing voltage $S_2$ off and on in the post-control phase $P_3$ is preferentially undertaken in such a manner that an opening current and/or keep-open current of at least 2 A on average is set. The frequency and/or the amplitude of the alternating switching of the energizing voltage $S_2$ off and on in the keep-open phase $P_3$ can be varied, in particular, as a function of the operating conditions, for instance as a function of the counterpressure or of the temperature or such like.

Figure 2:
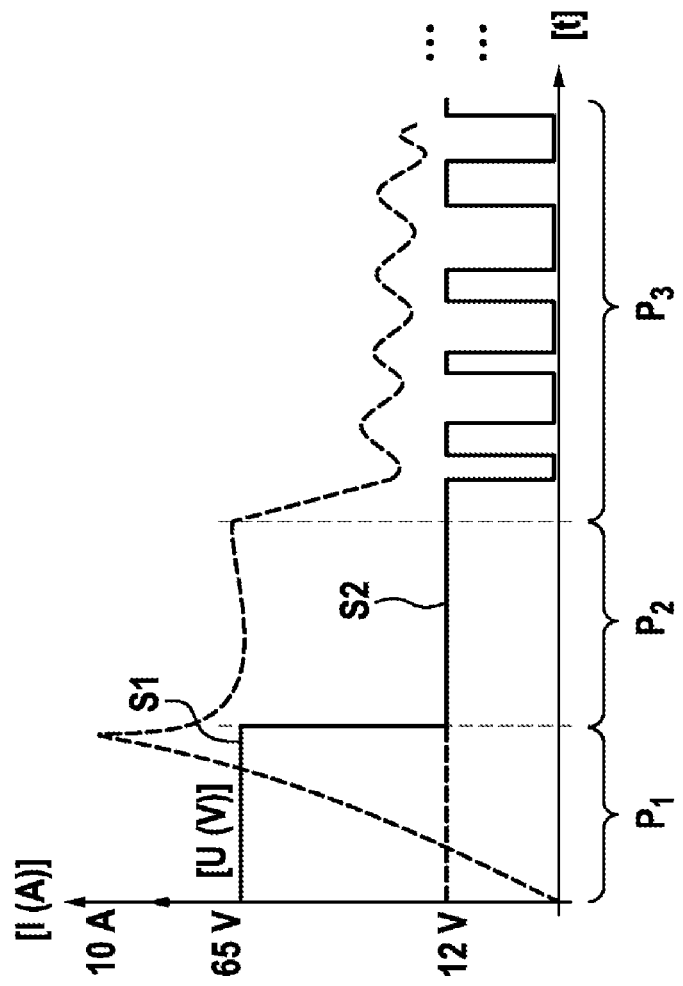

FIG. 2 shows a schematic representation of the activation profile for the pilot valve $V_1$.

The pilot valve $V_1$ is initially supplied with a booster voltage $S_1$ of, in the present case, 65 V in an opening phase $P_1$, so that the current I rises to over 10 A for a short time. The opening phase $P_1$ of the pilot valve lasts for about 10 ms before the booster voltage $S_1$ of 65 V is switched off, and in the energizing phase $P_2$ only a voltage of about 12 V is applied. After the energizing phase $P_2$, the energizing voltage $S_2$ of, in the present case, 12 V is alternately switched off and on in the commencing post-control phase $P_3$, so that the mean requisite keep-open energy for the pilot valve $V_1$ is still continuously made available.

FIG. 3 shows the activation profile of the further tank valves $V_2$. After the pilot valve $V_1$ has been opened, the pilot valve $V_1$ ensures that the pressure in the high-pressure circuit rises, so that the remaining tank valves $V_2$ can be opened contrary to an equalized pressure, and with distinctly less energy. No booster voltage $V_1$ of, for instance, 65 V is then necessary for this purpose; rather, the energizing voltage $S_2$ of 12 V is sufficient. By the alternating switching of the energizing voltage $S_2$ of, in the present case, 12 V, on and off, the further valves $V_2$ are supplied on average with a current of about 2 A, which ensures that the valves are opened and kept open securely.

This post-control phase $P_3$ lasts until such time as the valves $V_2$ and the pilot valve $V_1$ are closed again at the end of a journey. This is undertaken by the 12 V supply being set. The frequencies, phases and amplitudes, represented in the present case, of the voltage supply with the energizing voltage $S_2$ can furthermore be varied, depending upon the operating conditions, in particular as a function of the counterpressure and/or of the temperature. In the case of an emergency opening contrary to a particularly high pressure (for instance, during or shortly after an accident with outbreak of fire and associated increase in pressure in the tank), the booster voltage $S_1$ of the pilot valve $V_1$ can also be applied distinctly longer and more frequently, in order to ensure the opening and keeping open.

The invention claimed is:

1. A method for opening a valve assembly for a fuel tank, said valve assembly comprising a pilot valve ($V_1$) and at least one further valve ($V_2$), comprising the following steps:
   applying (30) a booster voltage ($S_1$) for opening the pilot valve ($V_1$) in an opening phase ($P_1$) of the pilot valve ($V_1$),
   switching from the booster voltage ($S_1$) to an energizing voltage ($S_2$) at a conclusion of the opening phase ($P_1$) of the pilot valve ($V_1$) and a beginning of an energizing phase ($P_2$) of the pilot valve ($V_1$),
   applying (34) the energizing voltage ($S_2$) for keeping the pilot valve ($V_1$) open in the energizing phase ($P_2$) of the pilot valve ($V_1$), wherein the energizing voltage ($S_2$) is different than the booster voltage ($S_1$), and
   alternating switching off and on (36) of the energizing voltage ($S_2$) for keeping the pilot valve ($V_1$) open and for opening and keeping open the at least one further valve ($V_2$) in a post-control phase ($P_3$), so that the mean requisite keep-open energy for keeping the pilot valve ($V_1$) open and also the mean requisite opening energy and/or keep-open energy of the at least one further valve ($V_2$) is made available.

2. The method as claimed in claim 1, wherein the booster voltage ($S_1$) is numerically greater than the energizing voltage ($S_2$).

3. The method as claimed in claim 2, wherein the booster voltage ($S_1$) has an absolute value of more than 12 V.

4. The method as claimed in claim 1, wherein the opening phase ($P_1$) lasts for more than 2 ms.

5. The method as claimed in claim 1, wherein the energizing voltage ($S_2$) is lower than the booster voltage ($S_1$).

6. The method as claimed in claim 5, wherein the energizing voltage ($S_2$) has a value of 12 V or less.

7. The method as claimed in claim 1, wherein the alternating switching of the energizing voltage ($S_2$) off and on is undertaken in a post-control phase ($P_3$) in such a manner that an opening current and/or keep-open current of at least 2 amperes on average is set.

8. The method as claimed in claim 1, wherein the frequency and/or the amplitude of the alternating switching of the energizing voltage ($S_2$) off and on in the keep-open phase ($P_3$) is varied as a function of the operating conditions.

9. A system (1) for opening a valve assembly for a fuel tank for use in a fuel-cell-powered vehicle, the system-, comprising:
   a pilot valve ($V_1$),
   at least one further valve ($V_2$),
   a control unit for applying a booster voltage ($S_1$) for opening the pilot valve ($V_1$) and also for applying an energizing voltage ($S_2$) directly after the booster voltage ($S_1$), for keeping the pilot valve ($V_1$) open and for opening and keeping open the at least one further valve ($V_2$), wherein the energizing voltage ($S_2$) is different than the booster voltage ($S_1$), and
   the control unit having been designed and arranged within the system (1) in such a manner that the mean requisite keep-open energy for keeping the pilot valve ($V_1$) open and for opening and keeping open the at least one further valve ($V_2$) is capable of being made available by an alternating switching of the energizing voltage ($S_2$) off and on.

10. The system (1) as claimed in claim 9, wherein the pilot valve ($V_1$) and/or the at least one further valve ($V_2$) take the form of self-closing valves.

11. The system (1) as claimed in claim 10, wherein the pilot valve ($V_1$) and/or the at least one further valve ($V_2$) are solenoid valves.

12. The system as claimed in claim 9, wherein a detection unit is provided for detecting measured values for determining a suitable point in time for applying a variable voltage.

13. The system as claimed in claim 12, wherein a processing unit is provided for determining a suitable point in time for applying a variable voltage on the basis of measured values detected by means of the detection unit.

14. A motor vehicle including a system comprising:

a pilot valve ($V_1$), at least one further valve ($V_2$), a control unit for applying a booster voltage ($S_1$) for opening the pilot valve ($V_1$) and also for applying an energizing voltage ($S_2$) directly after the booster voltage ($S_1$), for keeping the pilot valve ($V_1$) open and for opening and keeping open the at least one further valve ($V_2$), wherein the energizing voltage ($S_2$) is different than the booster voltage ($S_1$), and the control unit having been designed and arranged within the system (1) in such a manner that the mean requisite keep-open energy for keeping the pilot valve ($V_1$) open and for opening and keeping open the at least one further valve ($V_2$) is capable of being made available by an alternating switching of the energizing voltage ($S_2$) off and on.

* * * * *